US006284083B1

(12) United States Patent
Dahlquist

(10) Patent No.: US 6,284,083 B1
(45) **Date of Patent: *Sep. 4, 2001**

(54) METHOD OF MAKING A MULTIWEB PERFORATED FOLDED PRODUCT

(75) Inventor: Ake L. Dahlquist, Dixon, IL (US)

(73) Assignee: Sleepeck Printing Company, Dixon, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/157,908

(22) Filed: Sep. 21, 1998

Related U.S. Application Data

(60) Continuation of application No. 08/563,474, filed on Nov. 28, 1995, now Pat. No. 5,857,705, which is a division of application No. 08/215,445, filed on Mar. 21, 1994, now Pat. No. 5,509,987, which is a division of application No. 07/782,219, filed on Oct. 24, 1991, now Pat. No. 5,296,066, which is a continuation-in-part of application No. 07/704,170, filed on May 22, 1991, now abandoned.

(51) Int. Cl.[7] ............................... B31F 1/00; B32B 31/00

(52) U.S. Cl. ........................... 156/201; 156/204; 156/324

(58) Field of Search .................................... 156/201, 204, 156/252, 256, 324, 257, 277, 290, 384, 488, 443, 459, 468, 470, 477.1, 516, 522, 467; 270/5; 281/15.1, 101; 462/19, 23; 493/396–397, 401, 405, 408, 410

(56) References Cited

U.S. PATENT DOCUMENTS 559,123 * 4/1896 Dickson .
802,031 * 10/1905 Eschenbach .
1,187,682 * 6/1916 Trueman .
2,272,803 * 2/1942 Horner .
3,291,678 * 12/1966 Enloe et al. .
3,588,085 * 6/1971 Bailey et al. .
3,665,817 5/1972 Katz et al. .
3,697,061 * 10/1972 Levine et al. .
3,713,673 1/1973 Katz .
3,738,686 * 6/1973 Morse .
3,899,381 * 8/1975 O'Brien et al. .
4,012,268 * 3/1977 Johnsen .
4,054,703 * 10/1977 Boehm .
4,089,514 5/1978 Skipworth .
4,279,409 7/1981 Pemberton .
4,522,427 6/1985 Yasui .
4,566,720 1/1986 Goldman et al. .
4,583,763 4/1986 Shacklett, Jr. .
4,711,686 12/1987 Instance .
4,817,990 4/1989 Krost .
4,824,503 4/1989 Wilen .
5,015,137 5/1991 Stenner .
5,021,273 6/1991 Kobayashi .
5,098,127 3/1992 Williamson et al. .
5,296,066 3/1994 Dahlquist .
5,509,987 4/1996 Dahlquist .

* cited by examiner

*Primary Examiner*—Jeff H. Aftergut
(74) *Attorney, Agent, or Firm*—Ryndak & Schwartz

(57) ABSTRACT

A method is disclosed for producing a perforated multiweb folded display product or insert having a width greater than the width of any single web forming a part thereof. The perforated multiweb product is also claimed. Gutterless joints are used to allow the display to lay flat when opened. Perforations allow the insert to be removably bound within a book or magazine. In some embodiments, displays having widths exceeding commercially available web widths are disclosed. In other embodiments, two or more webs are combined to yield web printed single or double magazine inserts or displays having an active viewing width in excess of 70 inches.

53 Claims, 4 Drawing Sheets

Fig. 11
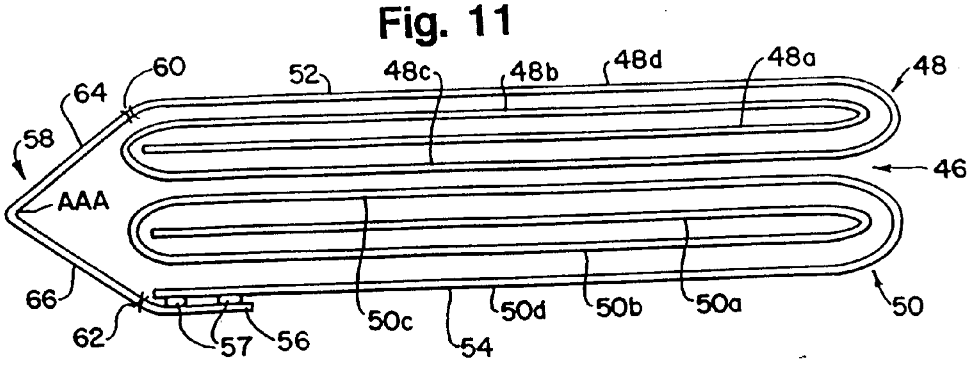
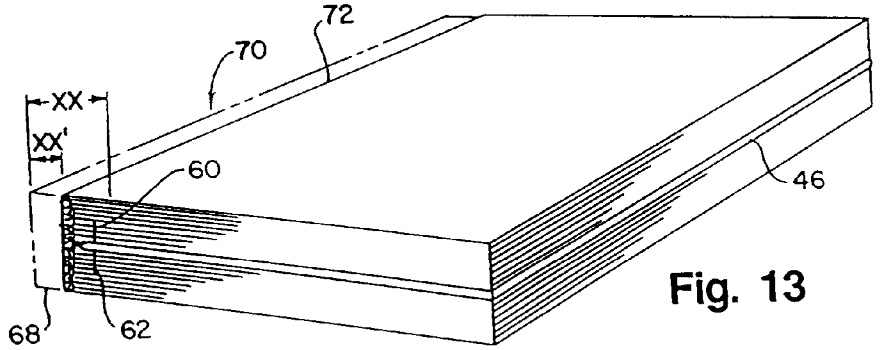
Fig. 13
Fig. 14
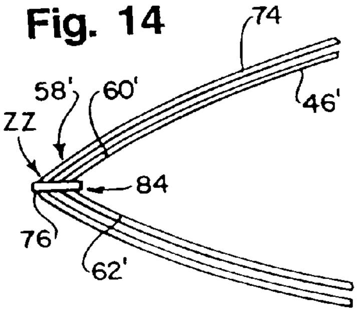
Fig. 12
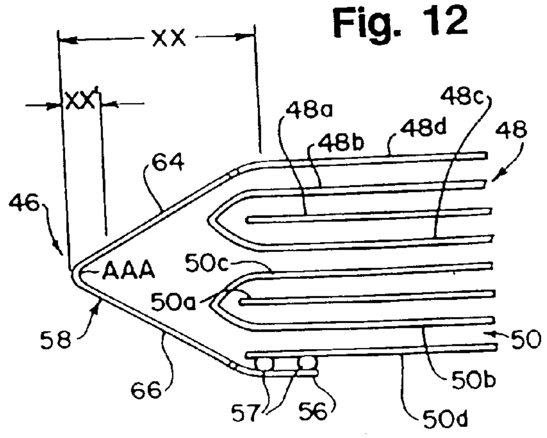

METHOD OF MAKING A MULTIWEB PERFORATED FOLDED PRODUCT

RELATED APPLICATION

This application is a continuation of application Ser. No. 08/563,474 filed on Nov. 28, 1995, now U.S. Pat. No. 5,857,705, which is a division of application Ser. No. 08/215,445 filed Mar. 21, 1994, now U.S. Pat. No. 5,509,987, which is a division of application Ser. No. 07/782,219 filed Oct. 24, 1991, now U.S. Pat. No. 5,296,066, which is a continuation-in-part of U.S. application Ser. No. 07/704,170, filed May 22, 1991, now abandoned, the disclosures of which prior applications are hereby incorporated by reference.

FIELD OF THE INVENTION

The invention relates to a method for producing a folded, perforated, printed product having an unfolded width exceeding that normally available when using a web printing process. More particularly, the invention relates to a multiweb, gutterless, perforated, folded product having an unfolded width greater than the width of a single web forming a part thereof and the method for producing that product.

BACKGROUND OF THE INVENTION

Advertisers frequently seek to gain the attention of the public by distributing novel, attention-getting printed media. One such media often employed by advertisers is a folded, multipanel printed display or magazine insert having an image area exceeding the nominal width of a magazine page. In many cases, advertisers desire inserts or displays having unfolded widths exceeding forty inches or more. When these inserts or displays are perforated, they may be removably bound into magazines or otherwise made to have separable portions.

Until now, such displays and inserts wider than forty inches have been expensive and difficult to produce. For example, wide inserts have been produced by feeding sheets of paper of up to 77 inches in width through a sheetfed printing press. This method is cumbersome and labor intensive as sheetfed presses typically can print only one side of a sheet at a time, thereby requiring multiple printing passes if both sides of the insert are to contain printed matter. Additionally, the sheetfed process typically requires a paper of at least 60-pound weight to provide the sheet rigidity required to successfully produce the insert. The required 60-pound weight is almost twice that required by the commonly used web printing process which also prints faster than sheetfed presses. Use of the sheetfed press therefore greatly increases production, paper and shipping costs compared to the web press.

For the reasons discussed above, the faster and cheaper web printing process would be preferred if it could be used to produce inserts of adequate width. Unfortunately, commercially available web presses produce printed webs having a maximum width of 36 to 38 inches. This limit results from both mechanical and economic factors.

In web presses presently known in the art, mechanical stability limits web width. For example, if printing cylinders begin to exceed the maximum standard 38-inch width, the mechanical stability of such printing cylinders would degrade to the point where commercially acceptable printed webs could not be produced. Furthermore, even if the cylinder stability problem could be solved, similar stability problems would have to be solved in auxiliary equipment such as splicers, perforators, folding towers and cutters. Finally, if all mechanical problems could be solved, conversion to more expensive wider web presses and auxiliary equipment would be economically infeasible for most applications.

Inherent properties of the paper used in web presses also limits web width. As water and ink is applied to the web, the paper fibers exhibit moisture-induced expansion. This expansion causes subsequently applied colors to be out of register with earlier applied colors if not corrected. For paper widths up to 38 inches, "buzzle wheels" are used to narrow the paper width, thereby bringing the edges of the paper back within an acceptable range of side register deviation. Unfortunately, applying buzzle wheel correction to wider paper widths is impractical, as the greater paper width would require the application of greater wheel forces frequently exceeding the breaking strength of the paper.

Accordingly, a need exists for a method to produce a web press-printed perforated, folded insert or display having a width exceeding the maximum web width available on the press.

SUMMARY OF THE INVENTION

In accordance with the present invention, a method for producing a multiweb perforated folded product or magazine insert is provided. The method involves folding and joining two or more printed webs to produce an unusually wide advertising brochure or insert, which can be perforated to readily allow removal of a portion from the magazine or other bound pages when desired.

More specifically, in one embodiment of the invention, a method is disclosed comprising simultaneously conveying first and second printed webs, longitudinally folding a first web to form an attaching panel, bringing the two webs into vertical registry, perforating at least one of the webs and thereafter joining the webs to form a longitudinal gutterless joint between the webs. In some embodiments, the first and second webs are conveyed in generally parallel paths. The joined webs can be transversely cut to form the multiweb folded product of desired length or page height.

In another embodiment, a method for producing a removable folded product or insert having an unfolded width greater than the width of any single web forming a part thereof is provided. The method includes the steps of simultaneously conveying first and second printed webs (such as from a web printing press), longitudinally folding the first web to form a plurality of viewing panels, continuously perforating at least one of the webs, longitudinally folding the first web to form a first web longitudinal web attaching panel, applying an adhesive to a portion of the attaching panel, thereafter abutting or contacting the second web to the first web attaching panel where it overlaps with the attaching panel to form a gutterless joint, and longitudinally folding the second web to form a plurality of second web viewing panels. In some embodiments, the first and second webs are folded into an equal number of viewing panels. In other embodiments, the product can be roll folded, Z-folded or folded in a combination of roll and Z-folds. In still other embodiments, the first web has a width greater than the second web by an amount equal to the width of the first web attaching panel. In still another embodiment, additional webs can be serially attached to previously attached webs to form a product with any desired number of joined webs.

In still another embodiment, a method is disclosed for producing a perforated roll folded product having a width greater than the width of any single web forming a part thereof. The method includes the steps of simultaneously conveying first and second webs along separate paths of travel, continuously perforating at least one of the webs, roll folding the first web to form a plurality of generally parallel first web viewing panels, roll folding the first web to form a longitudinal attaching panel, applying an adhesive to a portion of the attaching panel, and thereafter abutting or contacting the second web to the attaching panel to form a gutterless joint between the webs, and roll folding the second web to form a plurality of second web viewing panels. Additional embodiments are disclosed in which all panels are folded into substantially parallel planes and in which the first and second webs are folded into an equal number of viewing panels.

In yet another embodiment, a method is disclosed for producing a removable folded magazine insert having a width greater than that of any single web forming a part thereof. The method includes the steps of longitudinally folding a first web to form a plurality of viewing panels, longitudinally folding a second web to form a plurality of viewing panels, a binding panel and an attaching panel, attaching the two webs, perforating the binding panel, and folding the binding panel so that the folded webs overlap. In some embodiments, the binding panel includes two perforated lines, thereby forming an insert having a pair of removable displays. In still other embodiments, the removable inserts are bound into magazines.

Finally, the products produced by several of the above-described methods also are claimed.

In accordance with one aspect of the invention, a method for producing a perforated multiweb folded product is disclosed in which two or more webs can be joined to form a wide active image area.

In accordance with another aspect of the invention, two or more printed webs can be joined to form a perforated web printed display having a width greater than the commercially available web width of about 38 inches.

In accordance with still another aspect of the invention, a perforated, wide multiweb folded printed display is provided which lays flat when unfolded.

In accordance with yet another embodiment of the invention, a web printing process is used to produce removable advertising brochures or magazine inserts which are less costly than similar width inserts prepared on sheetfed presses.

BRIEF DESCRIPTION OF THE DRAWINGS

FIG. 11 is a front elevational view of a perforated multiweb folded magazine insert;

FIG. 12 is a partial front elevational view of is the insert of FIG. 11 illustrating dimensional details useful for binding the insert into a perfect-bound magazine;

FIG. 13 is a perspective view of a perfect-bound magazine incorporating the insert of FIG. 11; and FIG. 14 is a partial front elevational view of the insert of FIG. 11 illustrating how the insert may be incorporated in a saddle-bound magazine.

DETAILED DESCRIPTION OF THE INVENTION

FIGS. 1–14 illustrate one embodiment of a multiweb folded product having an active image area wider than the width of any web forming a part thereof. Throughout the FIGURES, like numbers refer to like parts or steps. While the described embodiment is a roll folded product formed from two printed webs, the method is useful for producing a product having as many folds, fold types and webs as can be accomplished by available printing and folding machinery.

Figure 1:
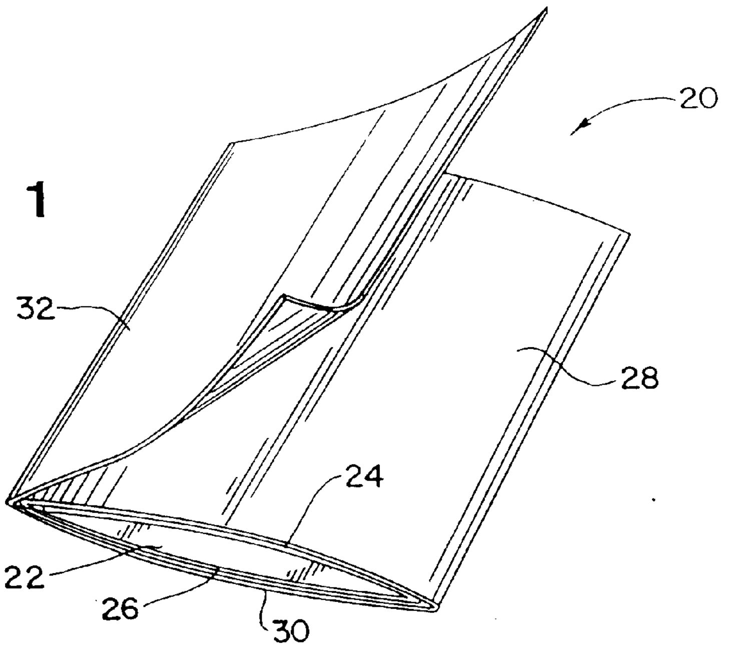
FIG. 1 is a perspective view of a multiweb product in accordance with the invention in a folded configuration.
Figure 2:
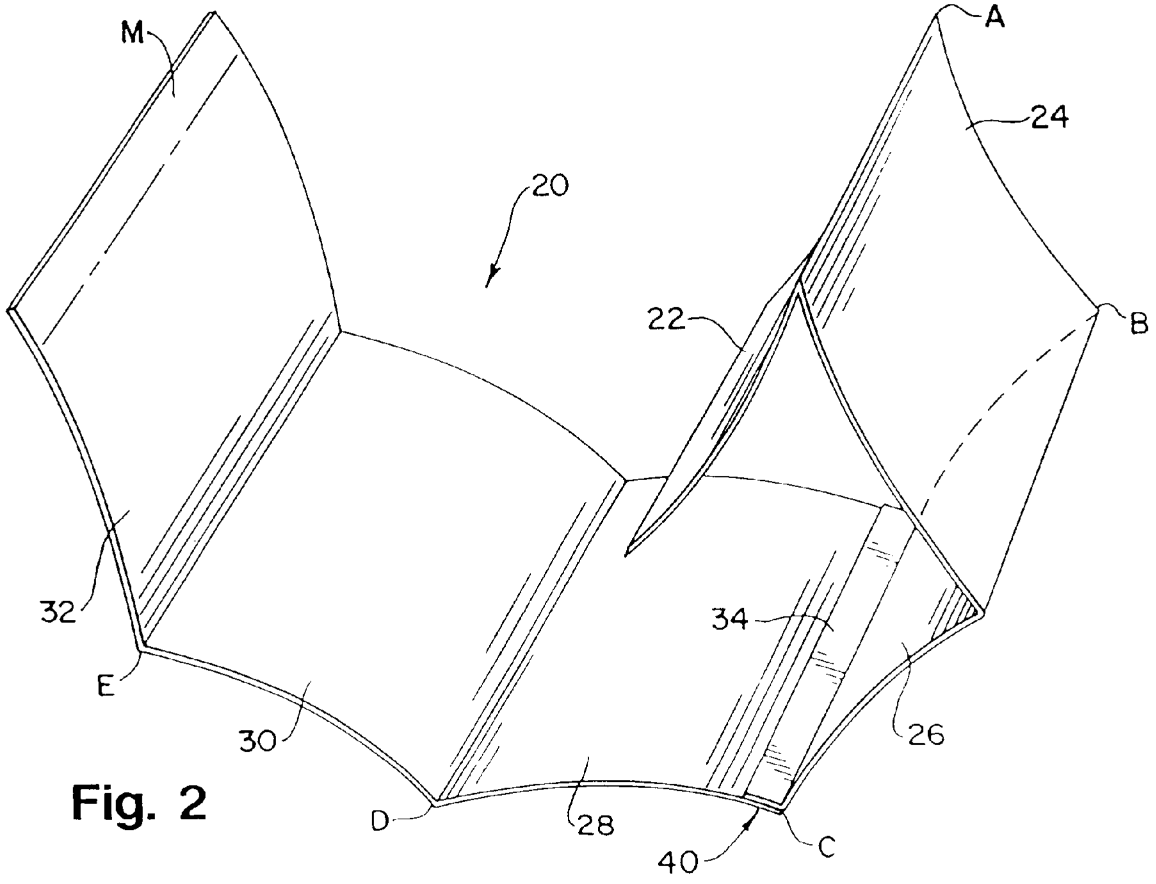
FIG. 2 is a perspective view of the multiweb product of FIG. 1 in an unfolded configuration.
Figure 9:
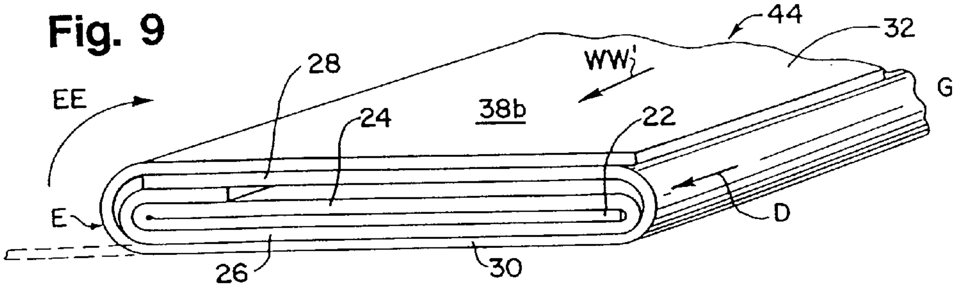
FIG. 9 is a perspective view of the multiweb paper product just prior to cutting the product to its finished height.
Figure 10:
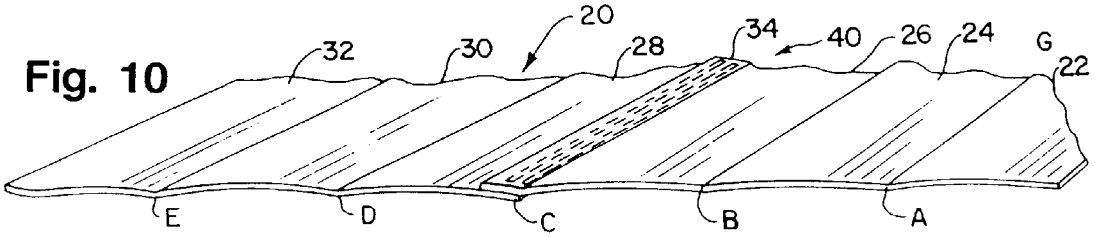
FIG. 10 is a perspective view of the finished multiweb product in its unfolded state.

FIGS. 1, 2 and 10 illustrate perspective views of a roll folded six-panel display 20 formed from two printed webs in accordance with the invention. Display 20 includes six individual viewing panels 22, 24, 26, 28, 30 and 32 for displaying a printed image or images. Display 20 also includes an attaching panel 34 used for joining the two printed webs forming display 20 as described later in conjunction with FIGS. 3–9. Panels 22, 24, 26, and 34 are formed from a first upper web 36 shown in FIG. 3, while panels 28, 30 and 32 are formed from a second lower web 38, also shown in FIG. 3.

Display 20 can be used either as a stand-alone product such as an advertising brochure or as a foldout insert for a magazine or book. If display 20 is to be used as a magazine insert, panel 32 can include a suitable margin M (see FIG. 2) to allow display 20 to be bound into the magazine. In either case, the available active image width (see FIG. 10) can exceed 70 inches when two standard webs of 36 to 38 inches are joined. The enhanced image width made possible by the invention permits commercially feasible production web press-printed displays having a width heretofore unavailable through the web press printing process.

Panels 22, 24, 26, 28, 30, 32 and 34 are delineated from one another by fold lines A, B, C, D and E as shown in FIG. 2. Folds A–E are made by conventional plowfolding apparatus well known in the art. While a wide variety of finishing equipment can be used to produce displays 20, the minimum equipment required consists of an appropriate number of plowfolding stations, a glue application system, a rotary cutter and a delivery system. Although the illustrated embodiment is a roll folded product, other embodiments could include “Z” or fan-style folds for all or some of the folds if suitable folding equipment is available. In either case, it is preferred that display 20 include a gutterless style joint 40 in which a bottom surface of panel 34 preferably along a longitudinal edge of panel 34 overlays a top surface of panel 28, preferably along a longitudinal edge of panel 28. This type of joint permits the display to lay flat and does not hide printed matter as would a “gutter” type fold in which top surfaces of adjacent panels are joined together behind the active image area.

The described embodiment is intended for the production of a 51-inch unfolded width paper display. Each step in the production of the insert is first described generically, and then production dimensions for the 51-inch display are provided.

Web printing presses are well known in the art and therefore are not described herein. Multiweb printing presses are especially suitable for use in accordance with the invention. Such multiweb presses can have two or more printed webs that exit the press in parallel and in registry with each other, such as illustrated in FIG. 3.

Figure 3:
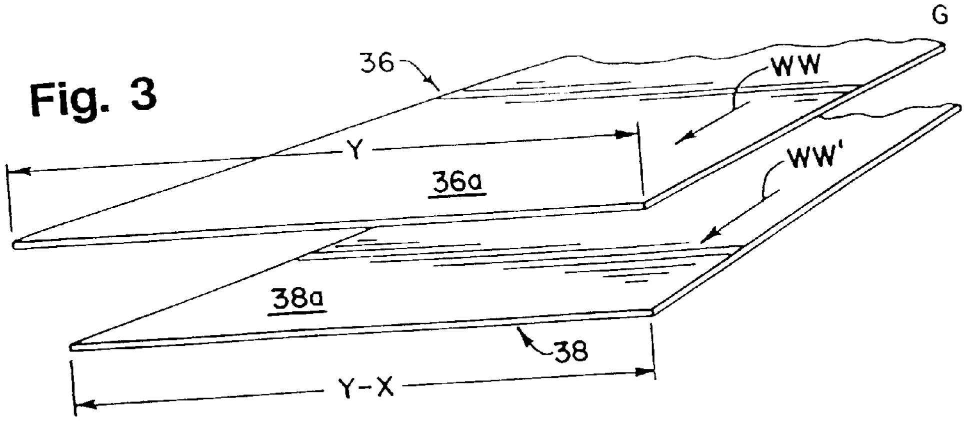
FIG. 3 is a perspective view of the two individual webs used to form the product shown in FIGS. 1 and 2.

FIG. 3 illustrates webs 36 and 38 as they emerge from a web style press system (not shown) in the direction of arrows WW and WW'. At the beginning of the display 20 assembly process, each web already has been printed, usually on both sides, with a consecutive series of identical impressions (not illustrated) running in the direction of arrows WW and WW'. While webs 36 and 38 can be paper, they can also be a plastic, film or other suitable substrate. In many applications, webs 36 and 38 will be printed with complementary portions of a large image so that the assembled display 20 contains a single image of width as shown in FIG. 10. As will be discussed in the following paragraphs, webs 36 and 38 will be folded and joined into a wider multiweb product which can be transversely cut on a rotary cutter between each product, of which there may be one or several identical or different products per impression to yield individual displays 20.

Webs 36 and 38 preferably are conveyed through the folding apparatus in substantial vertical registry with one another as shown in FIG. 3. As used herein, vertical registry refers to the alignment of images on the first and second webs which produces a properly vertically aligned image across the joined webs. Upper and lower webs 36 and 38 include upper surfaces 36*a* and 38*a* and lower surfaces 36*b* and 38*b* respectively. In FIG. 3, in order for panels 22–32 to each have the same width, upper web 36 can have a web width Y up to the maximum width available on the web press used to print web 36. Lower web 38 has a width of about Y-X, where X is the width of attaching panel 34. Lower web 38 is narrower because it need not include the width of an attaching panel. For a six-panel 51-inch display having a folded width of 8½ inches, upper web 36 should be about 27 inches wide while lower web 38 should be about 25½ inches wide. Both upper web 36 and lower web 38 could be of the same width, but the resulting panels would not be of the same width because of the width of the attaching panel.

If display 20 were to include additional webs, each web except the last joined web should be of width Y as all but the last web would require an attaching panel to attach the next web. The width relationships just described are preferred where each web contributes an identical number of same width viewing panels to the display. Panels of unequal width also can be joined using the invention as long as appropriate attaching panel material width is included on the appropriate webs.

FIGS. 3–9 illustrate the stepwise folding and joining operations required to produce display 20. Throughout these steps, webs 36 and 38 are continually conveyed through the appropriate folding and joining equipment. While webs 36 and 38 are illustrated as travelling in the same horizontal plane for ease of explanation, in actual practice, adjacent webs frequently change direction, most frequently in 90° increments, during their travel to the folding and joining equipment. This does not affect the assembly of displays 20 as long as proper vertical registry is established prior to the joining of the webs as discussed in detail in conjunction with FIGS. 7 and 8.

Figure 4:
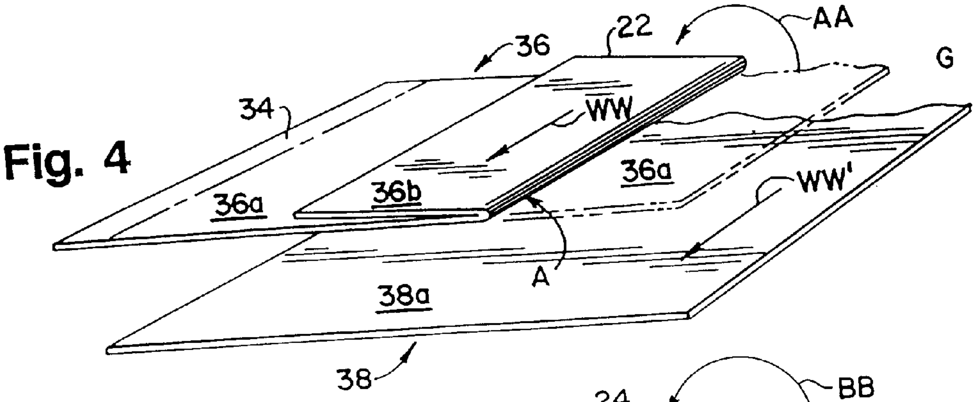
FIGS. 4, 5 and 6 are perspective views illustrating the stepwise folding of the upper web of FIG. 3.

FIG. 4 illustrates the first folding of upper web 36. Upper web 36 is folded in the direction of arrow AA to form fold A, which defines the inner edge of viewing panel 22. Both this and subsequent folds can be made on conventional plowfolding equipment. For a 51-inch wide display, this involves setting the plowfold shoe to make a fold 8½ inches from the gearside edge G of web 36. The shoe should be below a straight line between tangent points of the guide-rollers making last contact with the web before folding and the first roller making contact with the web after folding. Within any specific plow station, the three-dimensional location of the shoe must be accurately established to ensure proper placement for folding.

Figure 5:
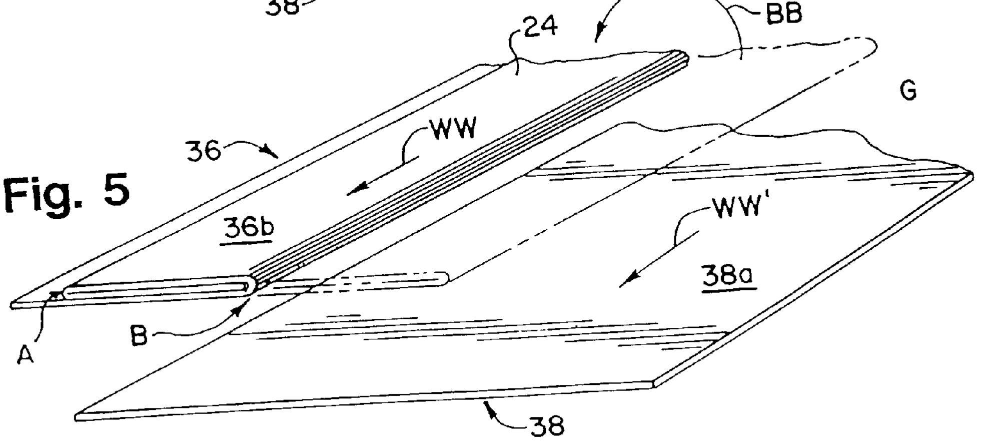

FIG. 5 illustrates the second folding of upper web 36. Again, web 36 is folded counterclockwise in the direction of arrow BB, thereby forming fold line B which, in conjunction with fold A, defines viewing panel 24. Folded upper web 36 is now located over about the left-hand third of lower web 38. For the 51-inch embodiment, the shoe must be located to form a fold 17 inches from the original gearside edge of upper web 36 with the plow shoe edge again placed below the straight line between roller tangent points as described in conjunction with FIG. 4.

Figure 6:
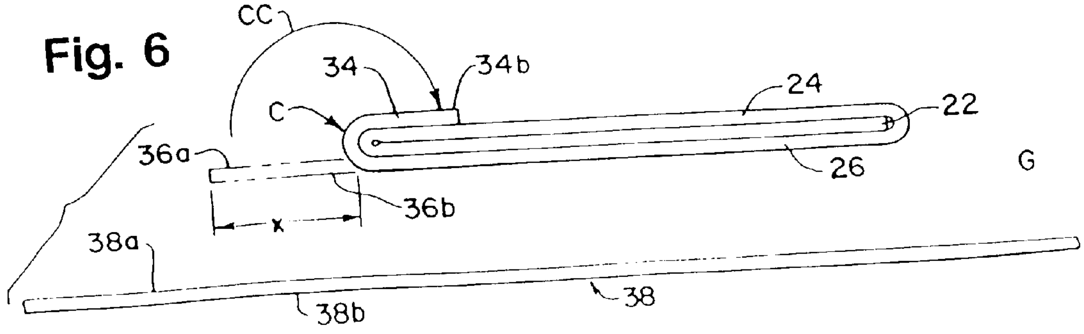

Attaching panel 34 is formed as shown in FIG. 6. The left-hand width X of upper web 36 is folded clockwise as indicated by arrow CC to form fold C, thereby defining attaching panel 34 having width X as well as viewing panel 26. Attaching panel 34 includes an exposed lower surface 34*b* formed from the lower surface 36*b* of upper web 36. For the 51-inch embodiment, this step requires that fold C be made 1½ inches toward gearside edge G of upper web 36 with the shoe positioned on the line between roller tangent points as previously described.

Figure 7:
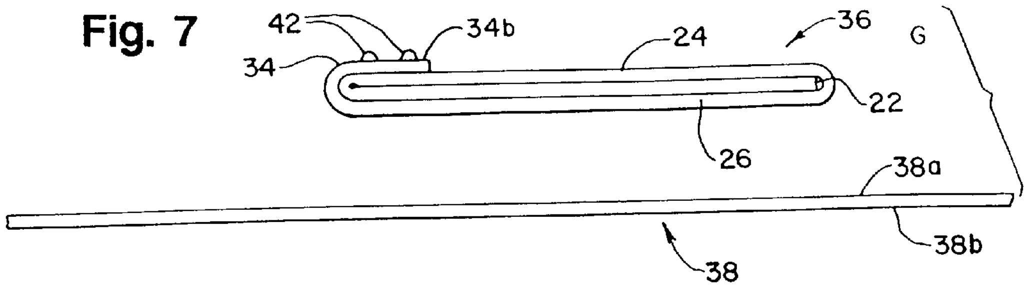
FIG. 7 is a front elevational view of the product of FIG. 6 illustrating the application of glue beads to the attaching panel of the upper web.

Turning now to FIG. 7, a pair of glue beads 42 are applied to exposed lower surface 34*b*, thereby readying upper web 36 for the adhesive attaching of lower web 38. The use of two glue beads is preferred where, as here, attaching panel 34 is about 1½ inches wide. Preferably, glue beads 42 are located close to the outer edges of panel 34. If an attaching panel wider than about 2 inches is used, three or more glue beads may be needed to form an acceptable joint. Any suitable number of glue beads can be utilized. In addition, any suitable method of joining the webs together, whether adhesively or otherwise can be utilized.

Figure 8:
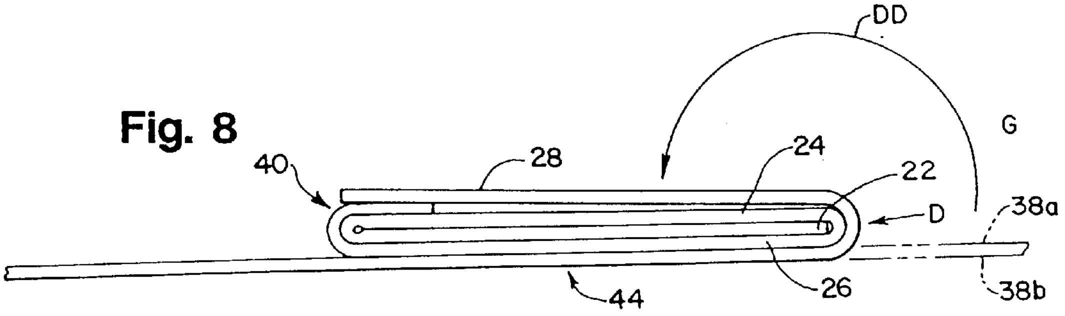
FIG. 8 is a front elevation view illustrating the attaching of the lower web to the upper web attaching panel.

Lower web 38 is attached to attaching panel 34 as shown in FIG. 8. The right-hand portion of lower web 38 is folded over folded upper web 36 in the direction of arrows DD to form fold D and to define viewing panel 28. Upper surface 38*a* of web 38 is then abutted or contacted against lower surface 34*b* of attaching panel 34 and glue beads 42 in the area of their overlap, thereby forming an adhesive gutterless joint 40 which attaches webs 36 and 38 to form a multiweb structure 44. For the 51-inch embodiment, this requires plowfolding lower web 38 8½ inches from gearside edge G as previously described.

FIG. 9 shows the final folding step required to produce displays 20. The left-hand third of lower web 38 is folded in the direction of arrow EE, forming fold E and defining the last two viewing panels 30 and 32. For the 51-inch embodiment, this requires plowfolding lower web 38 8½ inches toward gearside edge G.

After this final folding step EE, individual displays 20 are formed by passing joined multiweb structure 44 through a rotary cutter, which cuts the display at a desired longitudinal web length, for example, such as individual page height displays from the joined webs. For most magazines, this requires cutting the joined webs into 11⅛ inch high products. Finished displays 20 can then be unfolded flat for viewing as shown in FIG. 10.

Application of glue beads 42 preferably is accomplished by using individual closed pressure systems. The preferred glue viscosity is equivalent to 20 seconds in a #5 Zahn cup. Glue nozzle size preferably is between 0.02 to 0.035 inches in diameter and the nozzle should be in direct and continuous contact with the travelling web at an angle of about 30 degrees relative to the web.

FIG. 11 illustrates a double four-panel insert 46 particularly suited for use in a magazine or other group of bound pages, such as a book, pamphlet or brochure, for example. Insert 46 includes a first roll folded display 48 and a second roll folded display 50. Displays 48 and 50 each include four viewing panels 48*a–d* and 50*a–d,* respectively. Insert 46 is produced from two individual printed web portions 52 and 54 in accordance with the methods already discussed in connection with FIGS. 1–10.

Insert 46 also includes an attaching panel 56 useful for gluing web portion 54 to web 52. Glue beads 57 are used to permanently join webs 52 and 54. Web portion 52 also includes a binding panel 58 which is used to bind insert 46 into a magazine or book. As shown, binding panel 58 is formed by folding first web portion 52 at fold line AAA as shown in FIG. 11. In this instance, first web portion 52 should have a width greater than second web portion 54 by the combined widths of attaching panel 56 and binding panel 58. When bound into a magazine by panel 56, displays 48 and 50 can open outwardly from the bind-in location to form an eight-panel continuous image, if desired, or two separate adjacently located displays.

Frequently, it is preferred that displays 48 and 50 are removable from the magazine or book they are bound into initially. Continuous perforated lines 60 and 62 are included for this purpose. Lines 60 and 62 run continuously from the top to the bottom of web portion 52. Lines 60 and 62 permit displays 48 and 50 to be removed by tearing the display along lines 60 and 62, respectively. Although perforated lines 60 and 62 are shown near the bound edge of each display, one or more perforation lines can be provided at any display location accessible to perforation equipment prior to the binding of insert 46. Perforated lines 60 and 62 can be produced by a cylinder perforator, a perforation wheel or any other perforation devices or method known in the art.

FIG. 12 illustrates how insert 46 may be bound into a magazine produced using the "perfect-bound" binding process. In the perfect-bound process, adjacent pages are first glued together to form a glued spine. The spine is then ground to form a flat spine edge. Insert 46 may be bound into a perfect-bound magazine by gluing binding panel 58 into the magazine spine as the magazine is assembled. To accomplish this, binding panel 58 preferably includes first and second binding panel members 64 and 66, each of which have a width XX of about ⅝". When gluing is complete, a ground spine portion 68 having a width XX' of about ⅛" is removed from the glued edge of members 64 and 66 by grinding magazine spine 70. This leaves displays 48 and 50 perfect bound within the magazine as shown in FIG. 13 with perforation lines 60 and 62 about ½" from the finished edge 72 of spine 70. If a single display is to be bound into a magazine, binding panel 58 would consist of a single member of width XX located on one longitudinal edge of the single display (not shown).

Insert 46 also can be "saddle-bound" into a magazine as shown in FIG. 14. In this case, insert 46' is stapled or stitched within the magazine by stapling or stitching through adjacent page (or pages) 74 and binding member 58' at location ZZ with a staple 76. Binding insert 46' in this manner permits perforated lines 60' and 62' to be located closer to the centerfold 84 of the magazine and permits insert 46' to bear a continuous printed image across the centerfold 84 of insert 46' if desired.

While the method and product inventions have been discussed in conjunction with four- and six-panel roll folded displays, it should be remembered that displays having different numbers of panels, webs and types of folds can be produced by the described method and that the invention is to be limited only by the claims as recited below.

What is claimed is:

1. A method for producing a folded printed product having an unfolded width greater than the width of any single strip of material forming a part of the unfolded width comprising the steps of:

conveying a first printed elongated strip of thin, flexible material along a first path of travel;

simultaneously conveying a second printed elongated strip of thin, flexible material along a second path of travel;

longitudinally folding the first strip to form a first longitudinal attaching panel and a first viewing panel;

bringing said first and second elongated strips into vertical registry; and thereafter longitudinally joining said second strip to said attaching panel after said folding step to form a longitudinal gutterless joint between the elongated strips.

2. The method of claim 1 wherein said attaching panel is folded substantially parallel to said viewing panel.

3. The method of claim 1 further comprising the step of transversely cutting said first and second strips after said joining step to form a multi-strip folded paper product of a desired length.

4. The method of claim 1 wherein said elongated strips are conveyed from a web printing press after printing by said web printing press.

5. A method for producing a folded product having an unfolded width greater than the width of any single web forming a part of the unfolded width comprising the steps of:

web printing a first elongated strip of thin, flexible material;

web printing a second elongated strip of thin, flexible material;

conveying the first printed elongated strip of thin, flexible material along a first path of travel;

simultaneously conveying the second elongated strip of thin, flexible material along a second path of travel;

longitudinally folding the first elongated strip of thin, flexible material to form a plurality of first strip viewing panels;

longitudinally folding the first elongated strip of thin, flexible material to form a first longitudinal strip attaching panel;

applying an adhesive to a portion of said attaching panel;

bringing said first and second elongated strips of thin, flexible material into vertical registry;

longitudinally abutting said second elongated strip of thin, flexible material to said attaching panel to adhesively form a longitudinal gutterless joint between the elongated strips;

longitudinally folding the second elongated strip of thin, flexible material to form a plurality of second elongated strip of thin, flexible material viewing panels.

6. The method of claim 5 wherein second web folding step follows the abutting step.

7. The method of claim 5 further comprising forming a longitudinal perforation two inches or less from a longitudinal edge of the completed insert.

8. The method of claim 5 further comprising the step of longitudinally perforating one of said elongated strips parallel to their respective folds.

9. The method of claim 5 wherein said attaching panel is folded substantially parallel to said viewing panel.

10. The method of claim 5 wherein all said panels are folded into substantially parallel planes.

11. The method of claim 10 wherein said folding comprises roll folding.

12. The method of claim 10 wherein said folding comprises Z-folding.

13. The method of claim 10 wherein said folding comprises roll folding and Z-folding.

14. The method of claim 5 wherein the folded second elongated strip viewing panels surround the folded first elongated strip viewing panels.

15. The method of claim 5 wherein the first elongated strip and the second elongated strip are folded into an equal number of first elongated strip viewing panels and second elongated strip viewing panels.

16. The method of claim 5 wherein said first elongated strip width is greater than said second elongated strip width.

17. The method of claim 16 wherein said first elongated strip width exceeds said second elongated strip width by an amount about equal to the width of said first elongated strip attaching panel.

18. The method of claim 5 further comprising the steps of longitudinally folding the second elongated strip to form a second elongated strip attaching panel, applying an adhesive to the second elongated strip attaching panel and abutting a third elongated strip to said second elongated strip attaching panel to form a gutterless joint between said second and third elongated strips.

19. The method of claim 18 further comprising the step of longitudinally perforating at least two of said elongated strips.

20. The method of claim 18 wherein one or more additional elongated strips are connected by first folding the last attached elongated strip to form an additional attaching panel and then adhesively connecting one of the additional elongated strips, said folding and connecting steps being repeated until all one or more additional panels are connected together.

21. The method of claim 20 further comprising the step of longitudinally perforating at least one of said additional elongated strips.

22. The method of claim 5 wherein a lower surface of said first elongated strip is abutted to an upper surface of said second elongated strip.

23. The method of claim 5 further comprising the step of transversely cutting said first and second elongated strips after said joining step to form a multi-elongated strip folded paper product of a desired length.

24. The method of claim 5 wherein said first elongated strip includes a binding panel for binding the product into a magazine or book and wherein said binding panel includes a perforated line for allowing the panel to be detached from the bound magazine or book.

25. A method for producing a roll folded perforated multi-elongated strip product having an unfolded width greater than the width of any single elongated strip forming a part of the unfolded width comprising the steps of:

conveying a first printed elongated strip along a first path of travel;

simultaneously conveying a second printed elongated strip parallel to the first web;

continuously perforating at least one of said elongated strips;

roll folding the first elongated strip to form a plurality of generally parallel first web viewing panels;

roll folding the first elongated strip to form a first longitudinal web attaching panel;

applying an adhesive to a portion of said attaching panel; thereafter abutting said second elongated strip to said attaching panel to adhesively form a longitudinal gutterless joint between the elongated strips; and roll folding the second elongated strip to form a plurality of second elongated strip viewing panels.

26. The method of claim 25 wherein said first and second elongated strips are conveyed in vertical registry prior to the abutting step.

27. The method of claim 26 wherein the first elongated strip and the second elongated strip are folded into an equal number of first elongated strip viewing panels and second elongated strip viewing panels.

28. The method of claim 26 wherein said first elongated strip width is greater than said second elongated strip width by an amount about equal to the width of said first elongated strip attaching panel.

29. The method of claim 25 wherein all said panels are folded into substantially parallel planes.

30. The method of claim 25 further comprising the steps of longitudinally folding the second elongated strip to form a second longitudinal elongated strip attaching panel, applying an adhesive to the second elongated strip attaching panel and abutting a third elongated strip to said second elongated strip attaching panel to form a gutterless joint between said second and third elongated strips.

31. The method of claim 25 wherein said first elongated strip includes a binding panel and wherein said first elongated strip width is greater than said second elongated strip width by the width of said first elongated strip attaching panel and said first elongated strip binding panel.

32. The method of claim 31 wherein said first elongated strip binding panel is continuously and linearly perforated.

33. A method for producing a removable folded insert for binding into a magazine or book having an unfolded width greater than the width of any single elongated strip forming a part of the unfolded width comprising the steps of:

longitudinally folding a first flexible printed elongated strip of material to form a first display having a plurality of first elongated strip viewing panels;

longitudinally folding a second elongated strip to form a second display having a plurality of second elongated strip viewing panels, an attaching panel and a binding panel;

applying an adhesive to a portion of said attaching panel;

thereafter abutting said first elongated strip to said attaching panel to form a gutterless joint between the elongated strips;

longitudinally folding said binding panel to define first and second binding panel members so that said first folded elongated strip generally overlaps said second folded elongated strip; and cutting said joined elongated strips to form a removable magazine insert of a desired length.

34. The method of claim 33 including the step of longitudinally perforating a single binding panel member so that said first display or said second display can be removed from the magazine or book.

35. The method of claim 33 including the step of longitudinally perforating both binding panel members so that said first and second displays can be removed from the magazine or book.

36. The method of claim 33 which further comprises the step of binding said insert into a perfect-bound magazine by attaching said binding panel into a magazine spine.

37. The method of claim 33 which further comprises the step of binding said insert into a perfect-bound magazine by attaching said binding panel into a magazine spine.

38. The method of claim 33 which further comprises the step of binding said insert into a saddle bound magazine by fastening said binding panel into a magazine centerfold.

39. The method of claim 33 which further comprises the step of binding said insert into a saddle bound magazine by fastening said binding panel into a magazine centerfold.

40. The method of claim 33 wherein said elongated strips are roll folded.

41. The method of claim 33 wherein said elongated strips are roll folded.

42. A method for producing a folded product of thin, flexible printed material comprising the steps of:

conveying a first printed elongated strip of thin, flexible material along a first path of travel;

simultaneously conveying a second printed elongated strip of thin, flexible material along a second path of travel;

longitudinally folding the first elongated strip to form a first longitudinal elongated strip attaching panel and a first elongated strip viewing panel;

bringing said first and second webs into vertical registry; and thereafter longitudinally joining said second web to said attaching panel of said first web after said folding step to form a longitudinal gutterless joint between the webs resulting in a multiweb folded product having an unfolded width greater than the individual width of each of the first and second webs in the folded product.

43. The method of claim 42 wherein one elongated strip is folded to have at least three folds.

44. The method of claim 43 wherein the folds are roll folds.

45. The method of claim 42 wherein each of said elongated strips is folded to have at least three folds.

46. The method of claim 45 wherein the folds are roll folds and Z-folds.

47. The method of claim 42 wherein at least one of the elongated strips is folded to have at least four folds.

48. The method of claim 42 wherein at least some of the folding to form a plurality of viewing panels takes place prior to the joining step.

49. A method for producing a folded product of thin, flexible printed material comprising the steps of:

web printing a first web;

web printing a second web;

conveying the first printed elongated strip of thin, flexible material along a first path of travel;

simultaneously conveying the second printed elongated strip of thin, flexible material along a second path of travel;

longitudinally folding the first elongated strip to form a plurality of first elongated strip viewing panels;

longitudinally folding the first elongated strip to form a first longitudinal elongated strip attaching point;

applying an adhesive to a portion of said attaching panel;

bringing said first and second webs into vertical registry;

longitudinally abutting said second web to said attaching panel to adhesively form a longitudinal gutterless joint between the webs; and longitudinally folding the second web to form a plurality of second web viewing panels.

50. The method of claim 49 wherein at least a portion of the folding to form said viewing panels occurs after the abutting step.

51. The method of claim 49 wherein at least a portion of the folding to form said viewing panels occurs after the abutting step.

52. A method for producing a folded product of thin, flexible material comprising the steps of:

conveying a first printed elongated strip of thin, flexible material along a first path of travel;

simultaneously conveying a second printed elongated strip of thin, flexible material parallel to the first elongated strip;

roll folding the first elongated strip to form a plurality of generally parallel first elongated strip viewing panels;

roll folding the first elongated strip to form a first longitudinal elongated strip attaching panel;

applying an adhesive to a portion of said attaching panels; thereafter abutting said second elongated strip to said attaching panel to adhesively form a longitudinal gutterless joint between the elongated strips; and roll folding the second elongated strip to form a plurality of second elongated strip viewing panels.

53. The method of claim 52 wherein at least a portion of the folding to form said viewing panels occurs after said abutting step.

* * * * *